United States Patent
Holland, III et al.

(10) Patent No.: US 6,851,061 B1
(45) Date of Patent: Feb. 1, 2005

(54) SYSTEM AND METHOD FOR INTRUSION DETECTION DATA COLLECTION USING A NETWORK PROTOCOL STACK MULTIPLEXOR

(75) Inventors: Daniel T. Holland, III, San Jose, CA (US); Roark B. Hilomen, San Jose, CA (US); Steven P. Lang, San Jose, CA (US)

(73) Assignee: Networks Associates, Inc., Santa Clara, CA (US)

(*) Notice: Subject to any disclaimer, the term of this patent is extended or adjusted under 35 U.S.C. 154(b) by 765 days.

(21) Appl. No.: 09/644,664

(22) Filed: Aug. 24, 2000

Related U.S. Application Data

(60) Provisional application No. 60/182,842, filed on Feb. 16, 2000.

(51) Int. Cl.[7] .................................. G06F 11/30
(52) U.S. Cl. ............... 713/201; 713/201; 713/154; 709/224
(58) Field of Search ............... 709/229, 220–230; 713/150–300; 707/9

(56) References Cited

U.S. PATENT DOCUMENTS

| | | | | |
|---|---|---|---|---|
| 6,131,163 A | * | 10/2000 | Wiegel | 713/201 |
| 6,279,113 B1 | * | 8/2001 | Vaidya | 713/201 |
| 6,487,666 B1 | * | 11/2002 | Shanklin et al. | 713/201 |

OTHER PUBLICATIONS

TCP/IP Illustrated, vol. 1 The Protocols by W. Richard Stevens, ADDISON–WESLEY copyright 1994, pp. 491–497.*

W.R. Stevens, "TCP/IP Illustrated," vol. 1, App. A, Addison–Wesley (1994).

* cited by examiner

Primary Examiner—Gregory A Morse
Assistant Examiner—Ellen C Tran
(74) Attorney, Agent, or Firm—Patrick J. S. Inouye; Christopher J. Hamaty

(57) ABSTRACT

A system and method for detecting network intrusions using a protocol stack multiplexor is described. A network protocol stack includes a plurality of hierarchically structured protocol layers. Each such protocol layer includes a read queue and a write queue for staging transitory data packets and a set of procedures for processing the transitory data packets in accordance with the associated protocol. A protocol stack multiplexor is interfaced directly to at least one such protocol layer through a set of redirected pointers to the processing procedures of the interfaced protocol layer. A data packet collector references at least one of the read queue and the write queue for the associated protocol layer. A data packet exchanger communicates a memory reference to each transitory data packet from the referenced at least one of the read queue and the write queue for the associated protocol layer. An analysis module receives the communicated memory reference and performs intrusion detection based thereon.

29 Claims, 11 Drawing Sheets

SYSTEM AND METHOD FOR INTRUSION DETECTION DATA COLLECTION USING A NETWORK PROTOCOL STACK MULTIPLEXOR

CROSS-REFERENCE TO RELATED APPLICATION

This patent application claims priority under 35 U.S.C. § 119(e) to provisional patent application Ser. No. 60/182,842, filed Feb. 16, 2000, the disclosure of which is incorporated herein by reference.

FIELD OF THE INVENTION

The present invention relates in general to network intrusion detection data collection and, in particular, to a system and method for intrusion detection data collection using a network protocol stack multiplexor.

BACKGROUND OF THE INVENTION

Enterprise computing environments typically consist of host computer systems, individual workstations, and network resources interconnected over intranetworks internal to the organization. These intranetworks, also known as local area networks, make legacy databases and information resources widely available for access and data exchange. These systems can also be interconnected to wide area networks, including public information internetworks, such as the Internet, to enable internal users access to remote data exchange and computational resources and to allow outside users access to select internal resources for completing limited transactions or data transfer.

Unfortunately, enterprise computing environments are also susceptible to security compromises. A minority of surreptitious users, colloquially termed, "hackers," abuse computer interconnectivity by attempting to defeat security measures and intrude into non-public computer resources without authorization. Hackers pose an on-going concern for system administrators charged with safeguarding data integrity and security.

Hackers often take advantage of flaws and limitations inherent to network architectures. For instance, most internetworks and intranetworks are based on a layered network model employing a stack of standardized protocol layers. The most widely adopted network model is the Transmission Control Protocol/Internet Protocol (TCP/IP) suite, such as described in W. R. Stevens, "TCP/IP Illustrated," Vol. 1, Ch. 1 et seq., Addison-Wesley (1994), the disclosure of which is incorporated herein by reference. Computers and network resources using the TCP/IP suite implement hierarchical protocol stacks which, at minimum, include link and network layers. End-to-end devices, such as workstations and servers, further include transport and application layers.

The layering and variability of implementation in TCP/IP suites expose numerous opportunities for network compromise and exploitation by hackers. Consequently, most networks employ some form of firewall or intrusion detection system as a first line of defense against hackers. Firewalls employ packet filtering, stateful packet inspection and application proxies while intrusion detection systems typically perform signature or statistical intrusion detection. Both of these forms of security require continuous access to network traffic.

Network packet filters present one prior art solution to providing network traffic to intrusion detection systems and some forms of firewall, such as described in W. R. Stevens, "TCP/IP Illustrated," Vol. 1, App. A, Addison-Wesley (1994), the disclosure of which is incorporated herein by reference. Packet filters capture and filter data packets obtained from a network interface that has been placed into promiscuous mode, typically by retrieving a copy from the network interface driver. Packet filters, however, suffer from several drawbacks. First, current packet filters are inherently bandwidth limited and cannot scale beyond approximately 10–20 Mbps of traffic. Packet filters also consume computational resources, including memory and processing cycles. Finally, receiving intrusion detection systems and firewalls must demultiplex raw packet traffic retrieved by packet filters into individual data packets corresponding to the individual protocol layers. The demultiplexing consumes further computational resources, duplicates work performed by the protocol stack, and introduces the potential for errors.

Therefore, there is a need for a scaleable solution to providing packet traffic for network intrusion detection and analysis. Preferably, such a solution would avoid duplication of protocol stack functionality and computational resource waste.

SUMMARY OF THE INVENTION

The present invention provides a system and method for dynamically collecting data for use in intrusion detection directly from the network protocol stack. A stack multiplexor introduces a set of shims at select points in the data flow of traffic through the protocol stack. The shims are introduced by redirecting driver entry points in a module switch table. Copies of message blocks referring to the collected data are forwarded to an analysis module for intrusion detection and analysis.

An embodiment of the present invention is a system and method for intrusion detection data collection using a protocol stack multiplexor. A hierarchical protocol stack is defined within kernel memory space. The protocol stack includes a plurality of communicatively interfaced protocol layers. Each such protocol layer includes one or more procedures for processing data packets. A data frame is processed through the protocol stack. The data frame includes a plurality of recursively encapsulated data packets which are each encoded with a protocol recognized by one of the protocol layers. Data is collected directly from the protocol stack from at least one of the processed data packets using a protocol stack multiplexor. Redirected references interface directly into at least one such protocol layer to the data packet processing procedures included within the at least one such protocol layer. A logical reference to the processed data packets is obtained from the interfaced protocol layer. The logical reference refers to a memory block in the kernel memory space within which the processed data packets are stored. The logical reference is provided to an intrusion detection analyzer executing within user memory space.

A further embodiment of the present invention is a system and method for detecting network intrusions using a protocol stack multiplexor. A network protocol stack includes a plurality of hierarchically structured protocol layers. Each such protocol layer includes a read queue and a write queue for staging transitory data packets and a set of procedures for processing the transitory data packets in accordance with the associated protocol. A protocol stack multiplexor is interfaced directly to at least one such protocol layer through a set of redirected pointers to the processing procedures of the interfaced protocol layer. A data packet collector references at least one of the read queue and the write queue for the associated protocol layer. A data packet exchanger communicates a memory reference to each transitory data packet from the referenced at least one of the read queue and the write queue for the associated protocol layer. An analysis module receives the communicated memory reference and performs intrusion detection based thereon.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
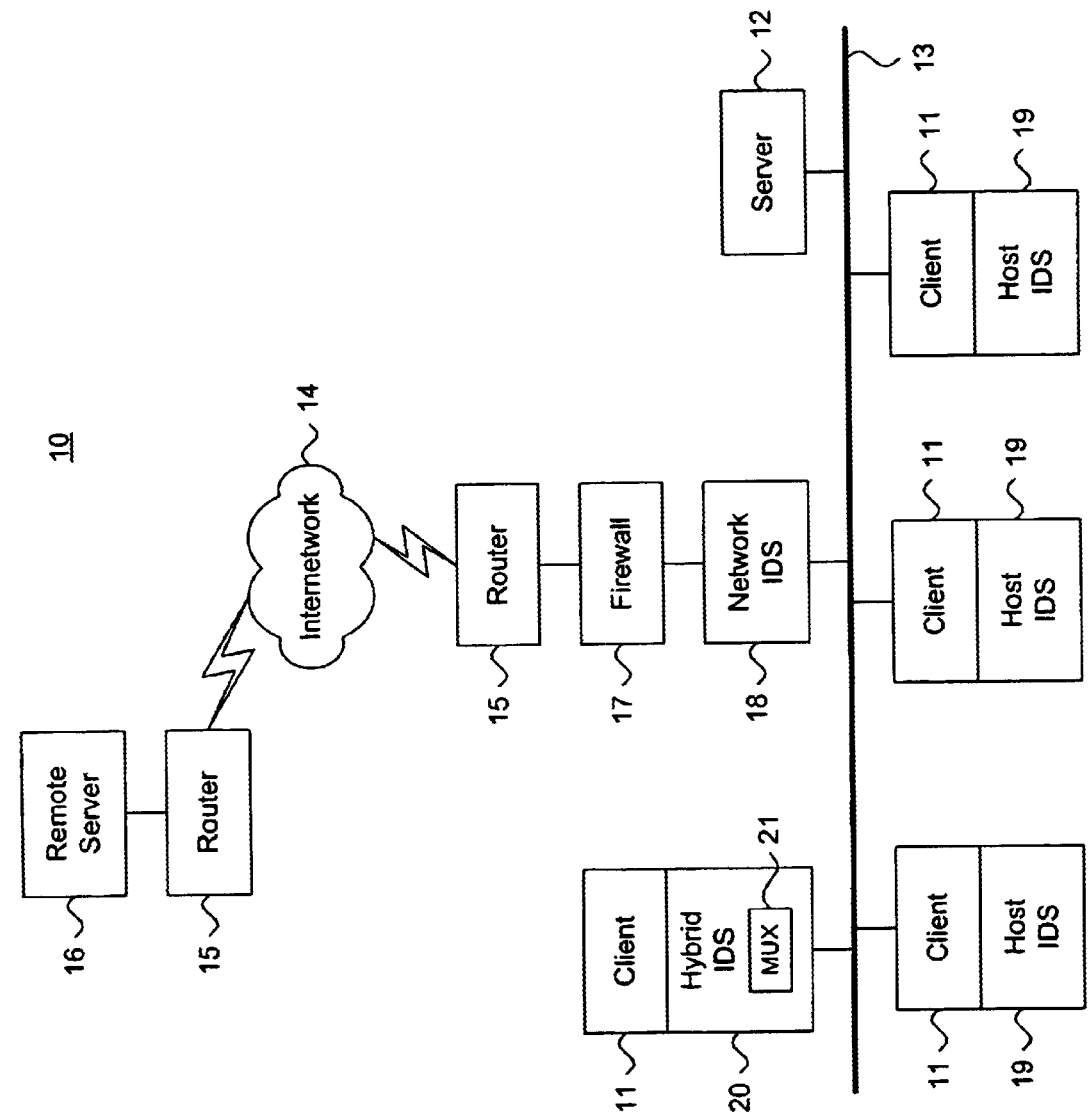
FIG. 1 is a block diagram showing a distributed computing environment, including a system for intrusion detection data collection using a network protocol stack multiplexor, in accordance with the present invention.

FIG. 1 is a block diagram showing a distributed computing environment 10, including a system for intrusion detection data collection using a network protocol stack multiplexor 21, in accordance with the present invention. The environment 10 includes a intranetwork 13 interconnected with an internetwork 14, such as the Internet. The intranetwork 13 includes a local server 12 with a plurality of clients 11 and similar network resources (not shown). The intranetwork 13 is interconnected to a remote server 16 via the internetwork 14 and both the remote server 16 and the intranetwork 13 are interfaced to the internetwork 14 via routers 15. Other network topologies and configurations are feasible.

The intranetwork 14 also includes several forms of intrusion detection, including a firewall 17, a network intrusion detection system (IDS) 18, a set of host IDSs 19, and a hybrid IDS 20. The firewall 17 prevents unauthorized access to the intranetwork using packet filtering, stateful packet inspection, and application proxies. The network IDS 18, host IDSs 19, and hybrid IDS 20 all collect and analyze a traffic stream to detect any attempts or actual compromises of network or system security. The network IDS 18 focuses on all traffic entering the intranetwork 18 and analyzes that traffic using signature-based and statistical-based intrusion detection techniques. Each host IDS 19 focuses on activities within their respective client 11 through internal security auditing mechanisms. The hybrid IDS 20 focuses on incoming traffic as well as internal activities and can include a protocol stack multiplexor 21 (MUX) for collecting data for use in intrusion detection, as further described below beginning with reference to FIG. 3. An exemplary IDS is the CyberCop Monitor product, licensed by Network Associates, Inc., Santa Clara, Calif. Firewalls, IDSS, and related network security concerns are described in "Next Generation Intrusion Detection in High Speed Networks," Network Associates, Inc. (1998), the disclosure of which is incorporated herein by reference.

The individual computer systems, including clients 11, server 12, and remote server 16, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
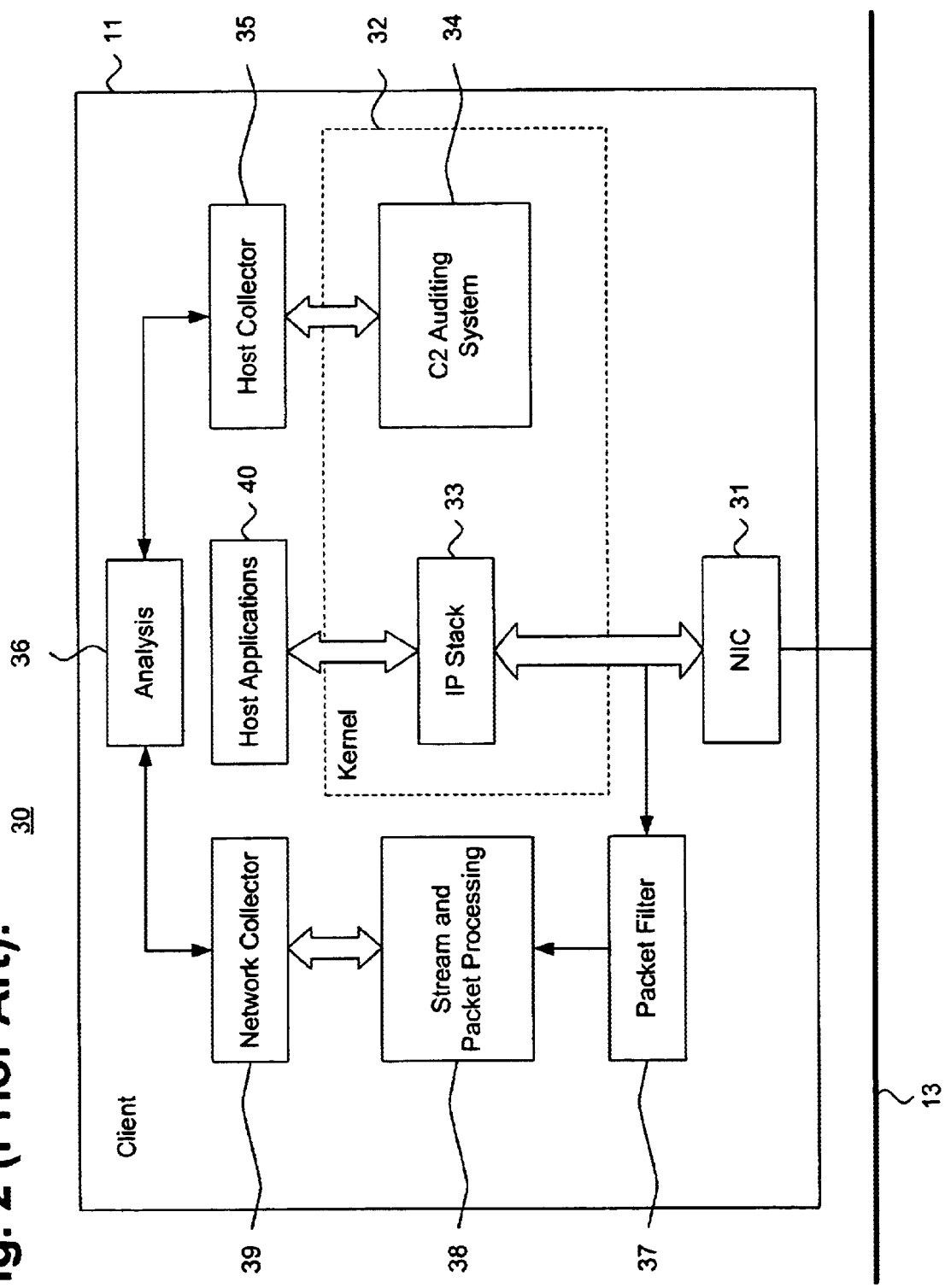
FIG. 2 is a block diagram of a prior art system for intrusion data collection.

FIG. 2 is a block diagram of a prior art system 30 for intrusion data collection. By way of example, the system 30 is a Transmission Control Protocol/Internet Protocol-compliant (TCP/IP) computing environment, such as described in W. R. Stevens, "TCP/IP Illustrated," Vol. 1, Ch. 1 et seq., Addison-Wesley (1994), the disclosure of which is incorporated herein by reference. However, the present discussion can equally be applied to other layered network architectures, including those based on the ISO/OSI model. A client 11 (shown in FIG. 1) is physically interconnected to an intranetwork 13 (or internetwork 14) via a network interface controller (NIC) 31. Incoming data frames are processed through an internet protocol (IP) stack 33 for eventual delivery to host applications 40. Similarly, outgoing data packets originating from the host applications 40 are processed through the IP stack 33 for eventual transmission over the intranetwork 13. A C2 auditing system 34 provides host-based security by monitoring system-level activities. A host collector 35 receives the monitoring data which is reported to an analysis module 36 for intrusion analysis and detection.

A packet filter 37 collects all network traffic transiting through the NIC 31. The NIC 31 is left in standard mode, that is, a mode which copies out all network traffic destined for the media access control (MAC) address of that NIC 31 only and includes, but is not limited to, specified ports, inbound and outbound traffic, and specific protocols. The packet filter 37 captures and filters the data frames. A stream and packet processing module 38 demultiplexes the filtered data frames into individual frames, datagrams, and packets in accordance with the network protocols supported by the IP stack 33. In effect, the stream and packet processing module duplicates the functionality of the IP stack 33 by reassembling raw data frames into properly formatted, higher protocol data packets. These data packets are collected by a network collector 39 for use by the analysis module 36.

Both the IP stack 33 and C2 auditing system operate in kernel memory space 32 while the remaining components operate in user memory space. The kernel memory space 32 is privileged memory space used for and controlled exclusively by the operating system. Transitioning data values to and from the kernel memory space 32 involves a context switch and incurs a performance penalty.

As a hardware device, the NIC 31 is outside the kernel memory space 32 but the actual copying of the network traffic from the NIC 31 to the packet filter 37 is performed by a network driver (not shown) also operating in the kernel memory space 32. Consequently, the copying of each data frame is computationally expensive due to the context switch and sheer volume of data copied. Similarly, the demultiplexing of raw data by the stream and packet processing module 38 duplicates the work performed by the IP stack 33 and introduces the potential for erroneously reassembled packets. These shortcomings can be exploited by a would-be network intruder and introduces problems when trying to accurately detect certain types of attacks.

Figure 3:
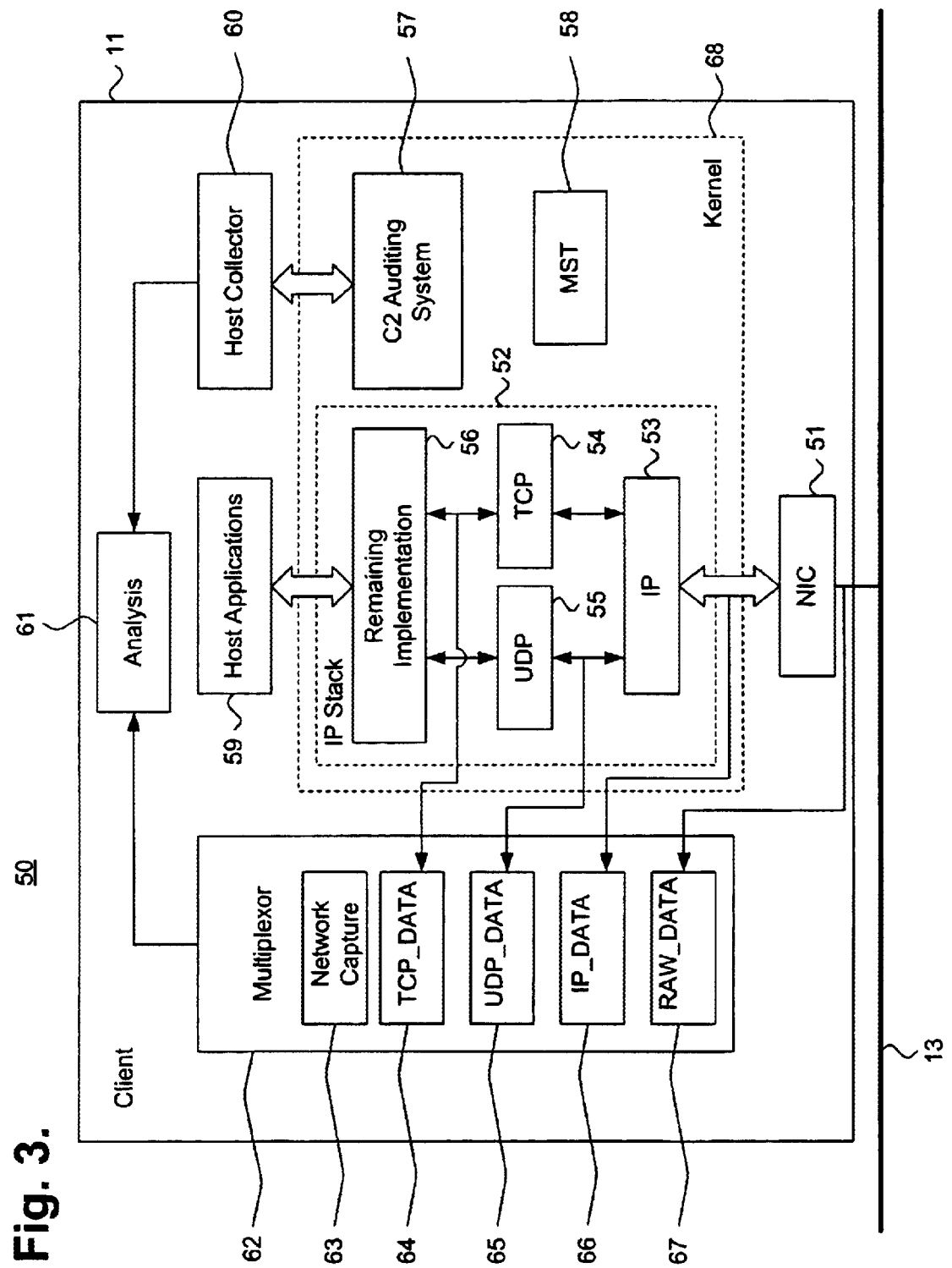
FIG. 3 is block diagram of a system for intrusion detection data collection using a network protocol stack multiplexor.

FIG. 3 is block diagram of a system for intrusion detection data collection 50 using a network protocol stack multiplexor 62. Raw network traffic transits to and from the intranetwork 13 (or internetwork 14) through the NIC 51 and is processed though the IP stack 52. The C2 auditing system 57 provides host-based security by monitoring system-level activities. The host collector 60 receives the monitoring data which is reported to the analysis module 61. The IP stack 52 and C2 auditing system both operate in kernel memory space 68. In the described embodiment, the IP stack 52 is implemented as a Streams-based stack for use in a Unix System V, Release 4, (SVR4) compliant operating environment. The device end of the IP stack 52 at the juncture between software and hardware is referred to as the driver end. The user end of the IP stack 52 at the juncture between user memory space and kernel memory space is referred to as the stream head. The IP stack 52 is structured into hierarchical protocol layers which include internet protocol (IP) layer 53, transmission control protocol (TCP) layer 54, and user datagram protocol (UDP) layer 55, plus other routines for processing other protocols as the remaining implementation 56. Incoming packets are forwarded to and outgoing packets originate from a set of host applications 59.

In addition to the NIC 51, select individual protocol layers between the driver end and the stream head, including IP layer 53, TCP layer 54, and UDP layer 55, are "shimmed" into the protocol stack multiplexor 62 at key data flow points, as further described below with reference to FIG. 4. Copies of the message blocks for each processed data packet, rather than copies of the data packets themselves, are received by the stack multiplexor 62 for raw data (RAW_DATA) 67, IP data (IP_DATA) 66, UDP data (UDP_DATA) 65, and TCP data (TCP_DATA) 64. No packet filtering or other processing is performed. A network capture module 63 collects the message blocks for use by the analysis module 61.

A module switch table (MST) 58 is also maintained in the kernel memory space 58. Each protocol layer is implemented as a stream driver. This table stores the entry points to the services that each stream driver provides. Each service is itself a procedure used for data packet processing. In the described embodiment, there are six main entry points, as follows:

| | |
|---|---|
| Open | Called when a connection is initiated to the driver. |
| Close | Called when a connection is closed. |
| Readput | Called when data needs to be placed in the Read Queue. |
| Writeput | Called when data needs to be placed in the Write Queue. |
| ReadService | Called when data cannot be put into the Read Queue and for deferred processing of data packets traveling upstream from the Driver End. |
| WriteService | Called when data cannot be put into the Write Queue and for deferred processing of data packets traveling downstream from the Stream Head. |

Other entry points and data packet processing procedures, including operating system dependent entry points, are feasible.

Each module in the stack multiplexor 62 is a computer program or module written as source code in a conventional programming language, such as the C++ programming languages, and is presented for execution by the CPU as object or byte code, as is known in the art. The various implementations of the source code and object and byte codes can be held on a computer-readable storage medium or embodied on a transmission medium in a carrier wave.

The stack multiplexor 62 operates in accordance with a sequence of process steps, as further described below beginning with reference to FIG. 5.

Figure 4:
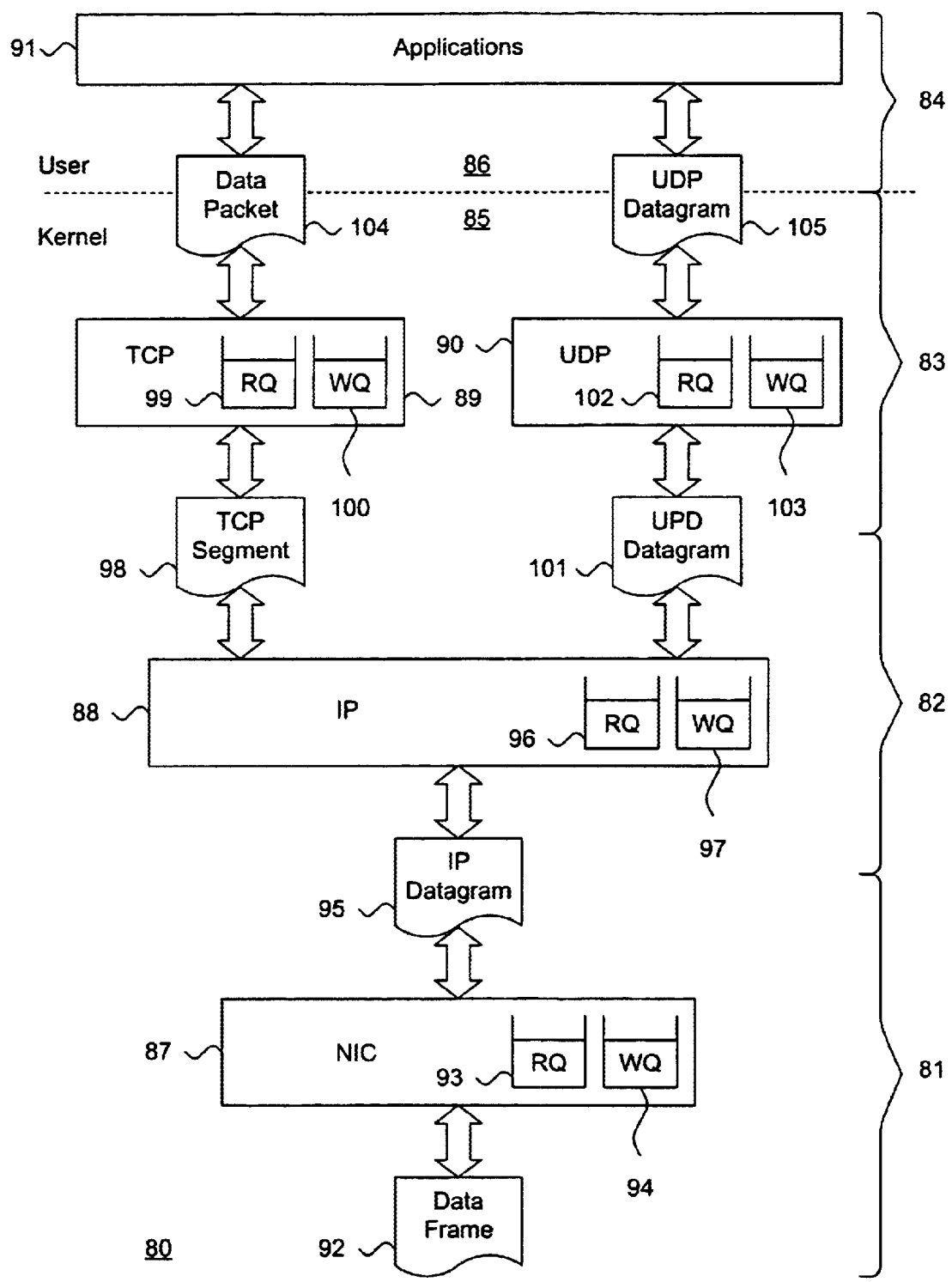
FIG. 4 is a block diagram of a Transmission Control Protocol/Internet Protocol-compliant (TCP/IP) network protocol stack implementation.

FIG. 4 is a block diagram of a Transmission Control Protocol/Internet Protocol-compliant (TCP/IP) network protocol stack implementation 80. The protocol layers are categorized into four layers, link layer 81, network layer 82, transport layer 83, and application layer 84. The link layer 81, network layer 82, and transport layer 83 operate in kernel memory space 85 while the application layer 84 operates in user data space 86.

In the described embodiment, data is collected from four protocol layer implementations using "shims" inserted at key locations in the data traffic stream. Although described with reference to upstream traffic flow from the driver end to the stream head, the present invention can equally apply to downstream traffic flow. Thus, raw incoming data frames 92 are tapped from the link layer 81 via a network interface controller 87. IP datagrams 95 are tapped from the network layer 82 via the IP layer 88. Finally, data packets and UDP datagrams are tapped from the transport layer 83 via the TCP layer 89 and UDP layer 90, respectively. TCP segments 98 and processed UDP datagrams 105 are ignored.

Using the Streams-based approach, each protocol layer implementation includes a pair of read queues 93, 96, 99, 102 and write queues 94, 97, 100, 103 for the NIC 87, IP layer 88, TCP layer 99, and UDP layer 90, respectively. The location of the shim depends upon the nature of the data being collected. Raw, IP, and UDP data are packed-based, so traffic originating from the NIC 87, IP layer 88, and UDP layer 90 can be collected directly from the respective read queues 93, 96, 102. However, TCP data is connection-based, so traffic must be collected after the IP layer 88 has completed processing of incoming TCP segments 98. A separate module (not shown) including a separate pair of read and write queues is introduced upstream from the TCP layer 99 and data packets 104 are collected from this upstream read queue.

Figure 5:
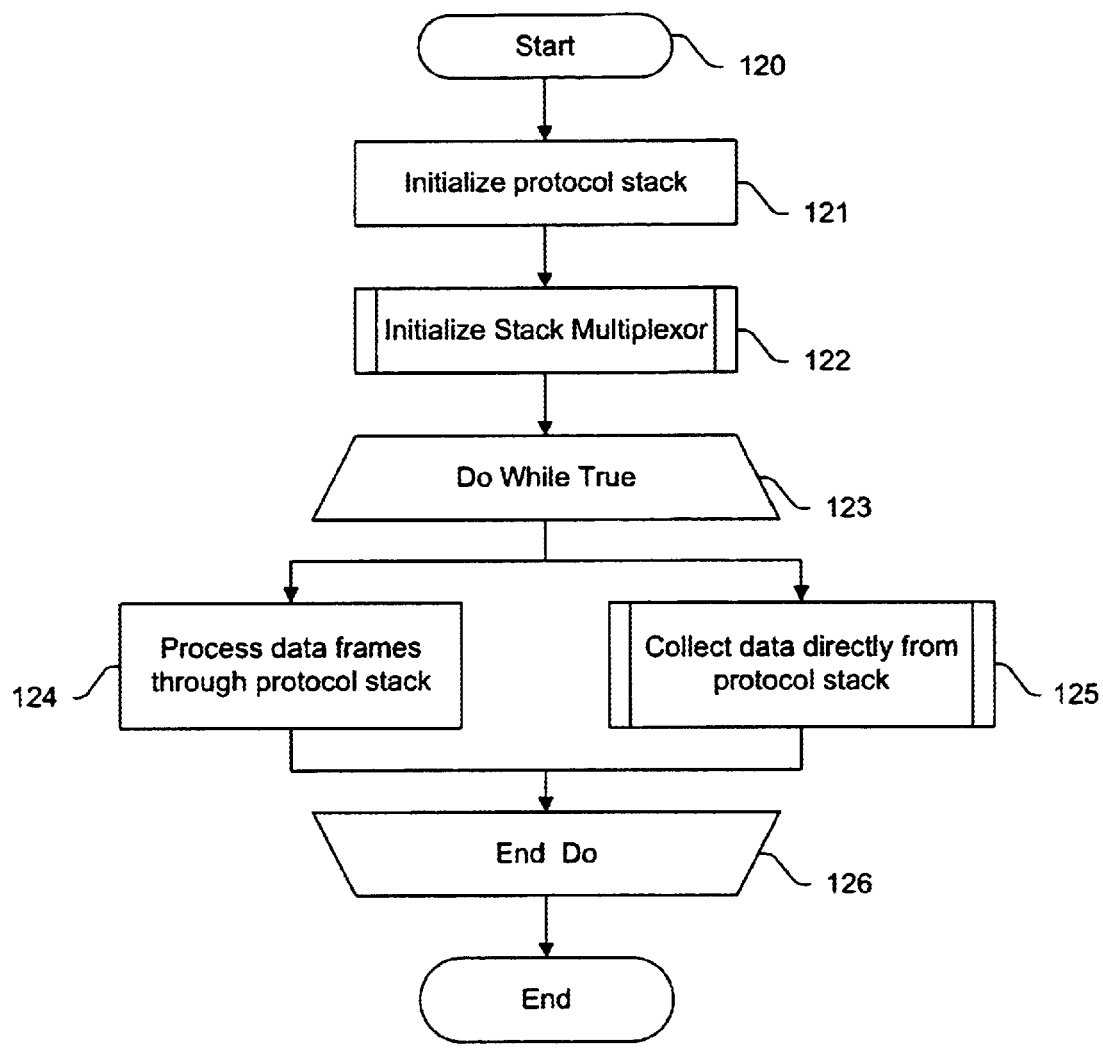
FIG. 5 is a flow diagram of a method for intrusion detection data collection using a network protocol stack multiplexor in accordance with the present invention.

FIG. 5 is a flow diagram of a method 120 for intrusion detection data collection using a network protocol stack multiplexor 62 (shown in FIG. 3) in accordance with the present invention. The method 120 operates in two phases. During the first phase (blocks 121–122), initialization, the IP stack 52 is initialized (block 121) by registering the driver entry points in the module switch table 58 and starting each driver. In addition, the protocol stack multiplexor 62 is initialized (block 122) to redirect select driver entry points, as further described below with reference to FIG. 6.

During the second phase (blocks 123–126), operation, data packets are processed in two threads of execution (blocks 124 and 125). In a first thread, data frames traveling upstream from the Driver End are processed through the IP stack 52 (block 124). In a second thread, data in the form of memory block references is collected directly from the IP stack 52 (block 125), as further described below with reference to FIG. 5. The second phase (blocks 123–126) continues indefinitely until the routine is terminated.

In the described embodiment, data is collected from data frames traveling upstream from the Driver End, but the present invention can equally apply to data packets traveling downstream from the Stream Head.

Figure 6:
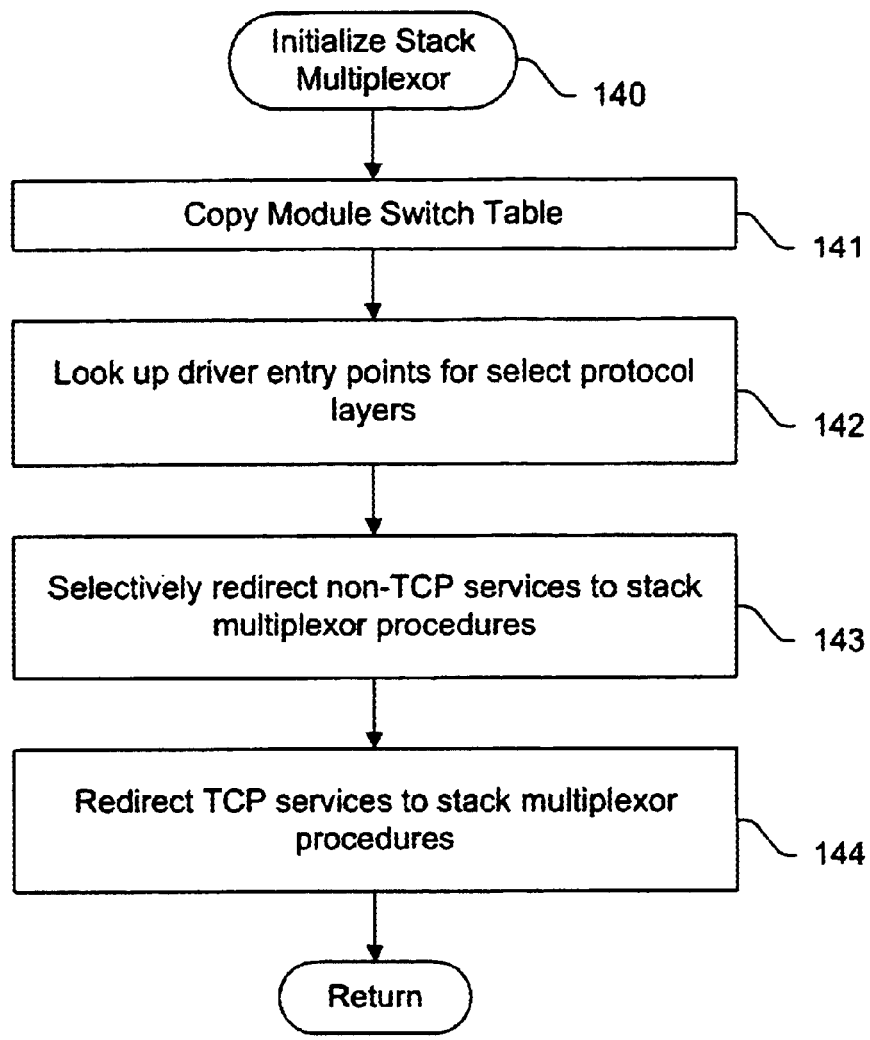
FIG. 6 is a flow diagram of a routine for initializing a stack multiplexor for use in the method of FIG. 5.

FIG. 6 is a flow diagram of a routine 140 for initializing a stack multiplexor 62 for use in the method of FIG. 5. The purpose of this routine is to redirect the entry points for select protocol layers in the IP stack 52. First, the module switch table 58 is copied (block 141) from the kernel memory space 68. Next, the driver entry points for select protocol layers (block 142), specifically, the link layer 81, network layer 82, and transport layer 83 (shown in FIG. 4) are determined. The driver entry points are then redirected as follows.

The driver entries in the module switch table 58 for the NIC 87, IP layer 88, and UDP layer 90 are selectively redirected to the stack multiplexor 62 (block 143). Both link layer 81 and network layer 82 protocols implement standardized Data Link Provider Interfaces (DLPIs). These interfaces allow network traffic to be directly tapped from the NIC 87 and EP layer 88. UDP is a packed-based protocol, so UDP datagrams 101 are captured by redirecting the Readput service routine for the UDP layer 90.

The driver entries for the TCP layer 89 are redirected to the stack multiplexor 62 (block 144) by introducing a separate data collection module upstream from the TCP layer 89. This data collection module includes a separate pair of read and write queues. The driver entries in the module switch table 58 are redirected to this data collection module and memory block references to the packets 104 processed by the TCP layer 89 are captured prior to forwarding the data packets 104 to the applications layer 91.

In the described embodiment, two kernel service routines, attach and detach, are used to redirect the driver entry points. When a driver is loaded, the attach service routine is called to publish the entry points in the module switch table 58 and to register the services to which the driver is to be linked. Similarly, when a driver is unloaded, the detach routine is called to unlink the driver from the registered services and to remove the entry points from the module switch table 58. The shims are created by saving existing entry points in the module switch table 58 and separately reattaching them within the stack multiplexor 62.

Upon completion of stack multiplexor 58 initialization, the routine returns.

Figure 7:
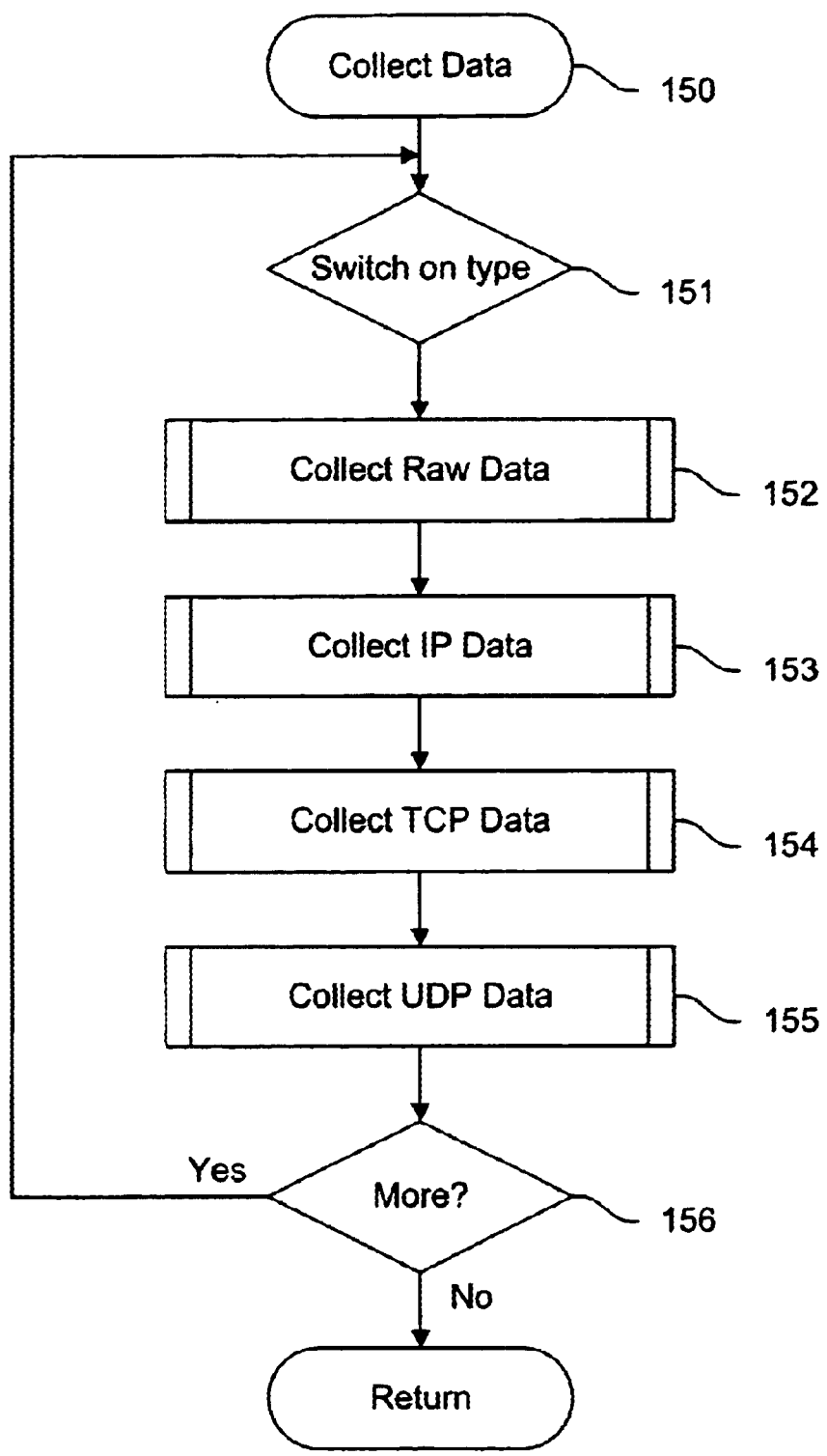
FIG. 7 is a flow diagram of a routine for collecting data for use in the method of FIG. 5.

FIG. 7 is a flow diagram of a routine 150 for collecting data for use in the method of FIG. 5. The purpose of this routine is to collect the various types of data from the individual protocol layers. Thus, depending upon the type of data (block 151), the appropriate routine is dispatched to collect raw data (block 152), IP data (block 153), TCP data (block 154), and UDP data (block 155), as further described below with respect to FIGS. 8, 9, 10, and 11, respectively. If further data remains to be collected (block 156), the routine continues dispatch. Otherwise, the routine returns.

Figure 8:
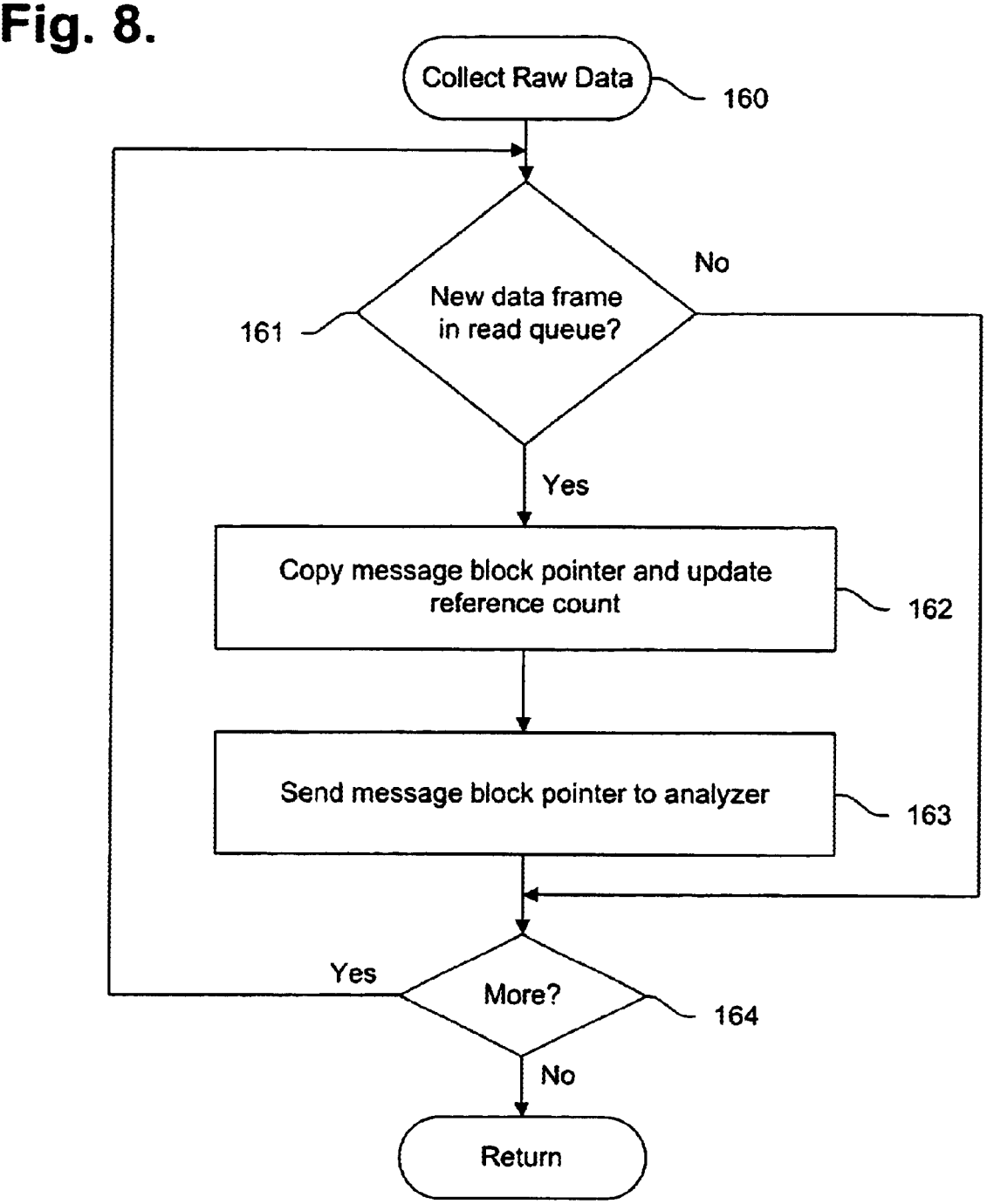
FIG. 8 is a flow diagram of a routine for collecting raw data frames for use in the routine of FIG. 7.

FIG. 8 is a flow diagram of a routine 160 for collecting raw data frames for use in the routine of FIG. 7. The purpose of this routine is to collect raw data frames 92 from the read queue 93 of the NIC 87. If a new data frame 92 has arrived in the read queue 93 (block 161), the message block pointer for the new data frame 92 is copied and the reference counter is incremented (block 162). The message block pointer is then forwarded to the analysis module 61 (block 163). If further data frames 92 remain (block 164), the routine continues collections. Otherwise, the routine returns.

Figure 9:
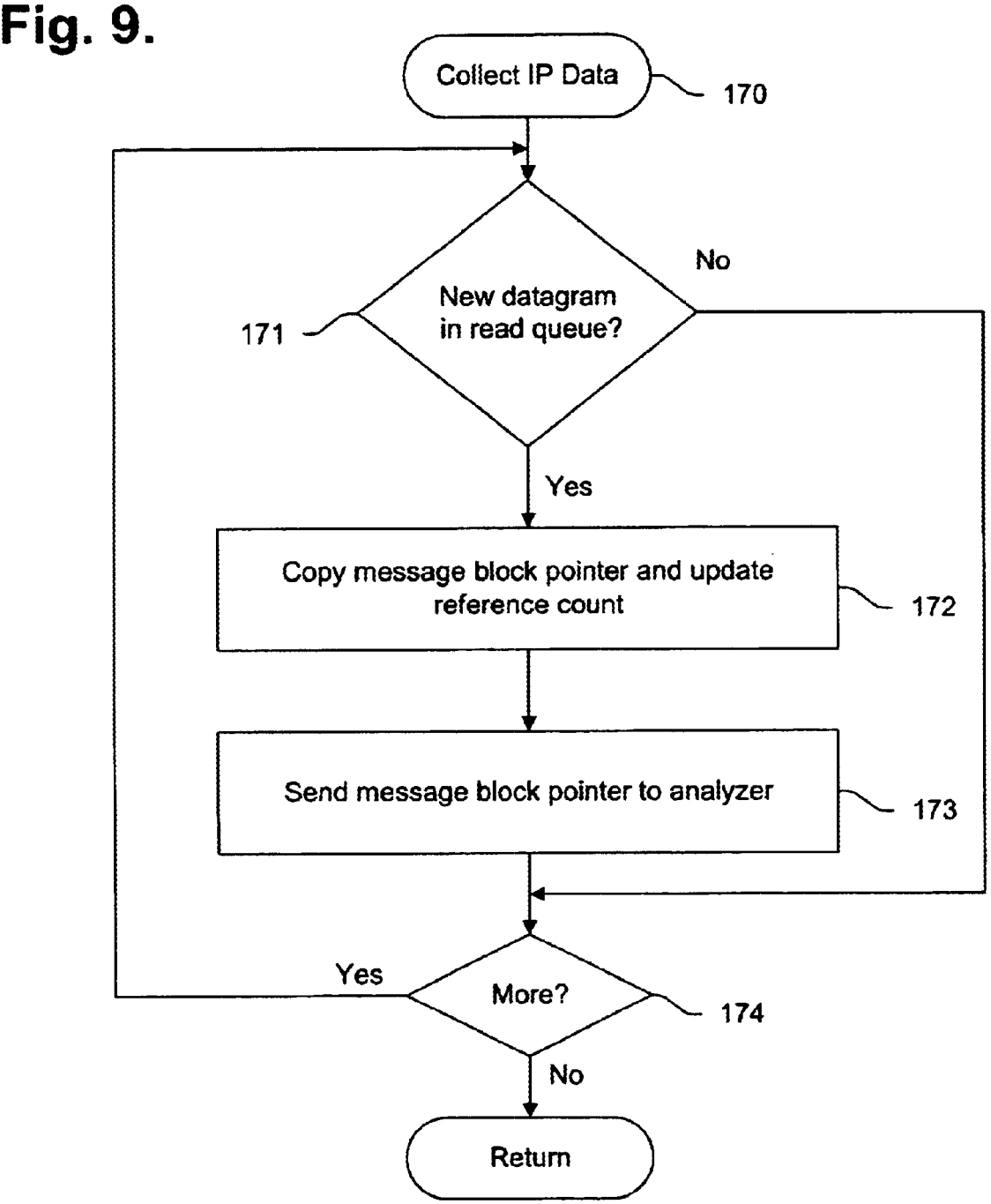
FIG. 9 is a flow diagram of a routine for collecting IP datagrams for use in the routine of FIG. 7.

FIG. 9 is a flow diagram of a routine 170 for collecting IP datagrams for use in the routine of FIG. 7. The purpose of this routine is to collect IP datagrams 95 from the read queue 96 of the IP layer 88. If a new IP datagram 95 has arrived in the read queue 96 (block 171), the message block pointer for the new IP datagram 95 is copied and the reference counter is incremented (block 172). The message block pointer is then forwarded to the analysis module 61 (block 173). If further IP datagrams 95 remain (block 174), the routine continues collections. Otherwise, the routine returns.

Figure 10:
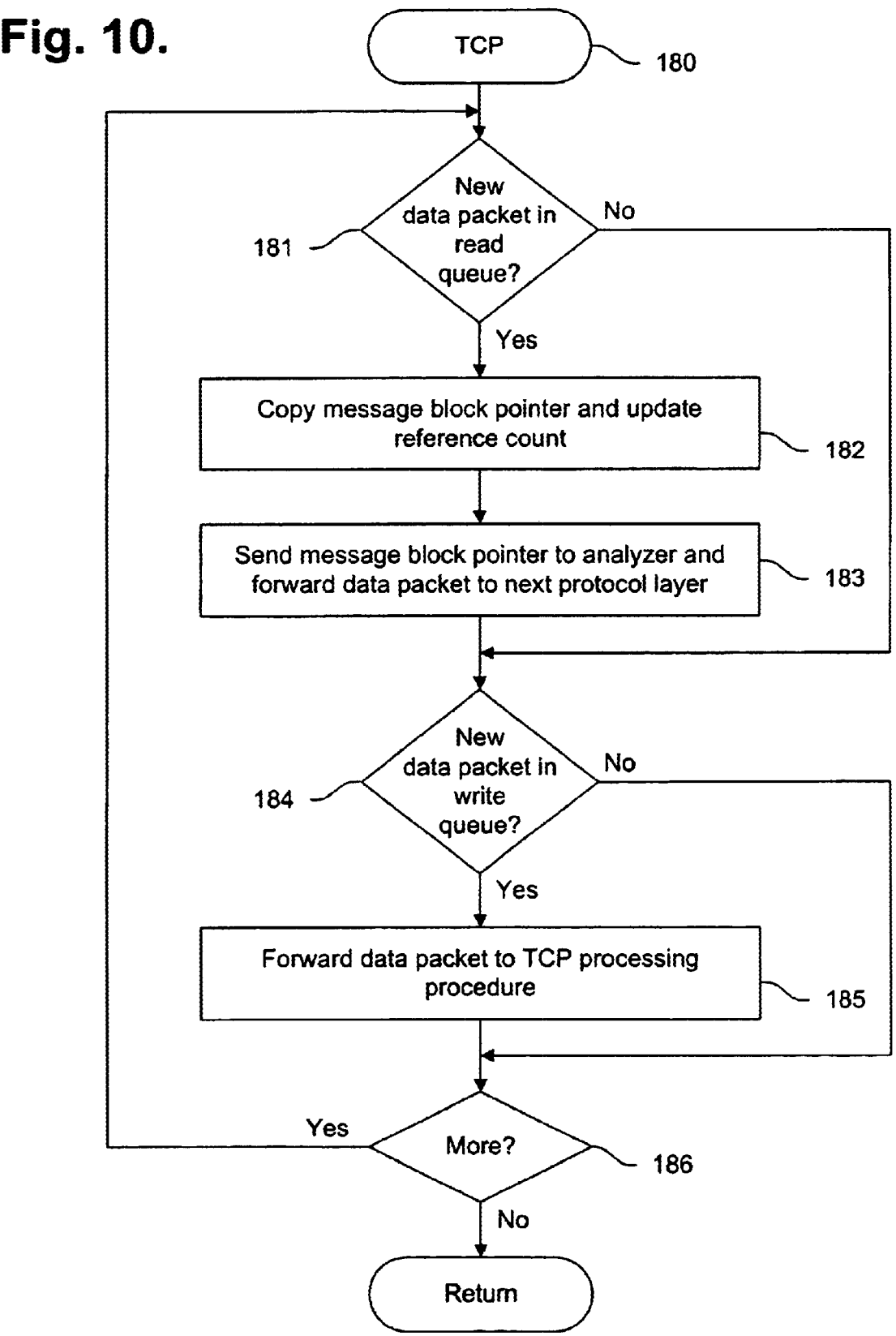
FIG. 10 is a flow diagram of a routine for collecting TCP-processed data packets for use in the routine of FIG. 7.

FIG. 10 is a flow diagram of a routine 180 for TCP-processed data packets for use in the routine of FIG. 7. The purpose of this routine is to collect TCP-processed data packets 104 from the read queue of a data collection layer introduced upstream from the TCP layer 89. If a new data packet 104 has arrived in the upstream read queue (block 181), the message block pointer for the new data packet 104 is copied and the reference counter is incremented (block 182). The message block pointer is then forwarded to the analysis module 61 (block 183). Similarly, if a new data packet 104 has arrived in the upstream write queue (block 184), the new data packet is forwarded to the TCP layer 89 (block 185). If further data packets 104 remain (block 186), the routine continues collections. Otherwise, the routine returns.

Figure 11:
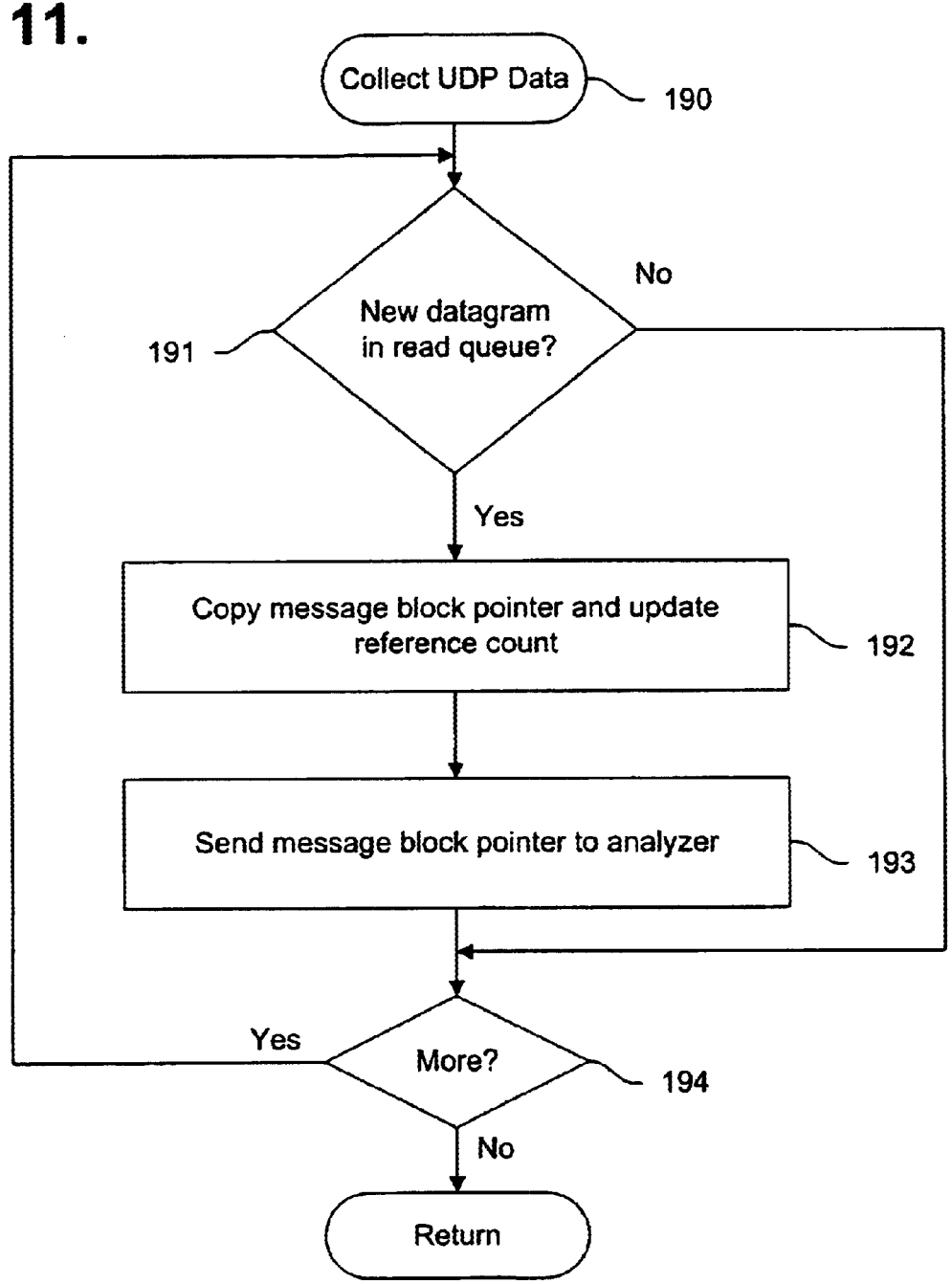
FIG. 11 is a flow diagram of a routine for collecting UDP datagrams for use in the routine of FIG. 7.

FIG. 11 is a flow diagram of a routine 190 for collecting UDP datagrams for use in the routine of FIG. 7. The purpose of this routine is to collect UDP datagrams 101 from the read queue 102 of the UDP layer 90. If a new UDP datagram 101 has arrived in the read queue 102 (block 191), the message block pointer for the new UDP datagram 101 is copied and the reference counter is incremented (block 192). The message block pointer is then forwarded to the analysis module 61 (block 193). If further UDP datagrams 101 remain (block 194), the routine continues collections. Otherwise, the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for intrusion detection data collection using a protocol stack multiplexor, comprising:
    a hierarchical protocol stack defined within kernel memory space and comprising a plurality of communicatively interfaced protocol layers, each such protocol layer comprising one or more procedures for processing data packets;
    a data frame processed through the protocol stack, the data frame comprising a plurality of recursively encapsulated data packets which are each encoded with a protocol recognized by one of the protocol layers; and
    a protocol stack multiplexor collecting data directly from the protocol stack from at least one of the processed data packets, comprising:
        an interface interfacing directly into at least one such protocol layer through redirected references to the data packet processing procedures comprised within the at least one such protocol layer; and
        a logical reference to the processed data packets obtained from the interfaced protocol layer, the logical reference referring to a memory block in the kernel memory space within which the processed data packets are stored and provided to an intrusion detection analyzer executing within user memory space.

2. A system according to claim 1, further comprising:

a network hardware interface in a link protocol layer logically located at a device end of the protocol stack;

an application software interface in a transport protocol layer logically located at a user end of the protocol stack; and the protocol stack multiplexor tapping the collected data from the protocol stack between and through the link protocol layer and the transport protocol layer.

3. A system according to claim 2, wherein the protocol stack comprises a Transmission Control Protocol/Internet Protocol-compliant (TCP/IP) protocol stack.

4. A system according to claim 1, further comprising:

a read queue associated with each protocol layer storing incoming data frames;

a write queue associated with each protocol layer storing outgoing data frame; and the protocol stack multiplexor retrieving the logical reference to the processed data packets from at least one of the read queue and the write queue.

5. A system according to claim 1, further comprising:

a module switch table in the kernel memory space storing the references to the data packet processing procedures comprised within the at least one such protocol layer; and an initialization module in the protocol stack multiplexor replacing select procedure references in the module switch table with references to data collection procedures in the protocol stack multiplexor.

6. A system according to claim 5, wherein one such protocol layer comprises a Transmission Control Protocol-compliant (TCP) protocol layer, further comprising:

the initialization module augmenting the procedure references in the module switch table for the procedures for processing data frames for the TCP protocol layer with references to TCP data collection procedures in the protocol stack multiplexor.

7. A system according to claim 5, wherein one such protocol layer comprises a User Datagram Protocol-compliant (UDP) protocol layer, further comprising:

the initialization module replacing the procedure references in the module switch table for the procedures for processing incoming data frames for the UDP protocol layer with references to UDP data collection procedures in the protocol stack multiplexor.

8. A method for intrusion detection data collection using a protocol stack multiplexor, comprising:

defining a hierarchical protocol stack within kernel memory space and comprising a plurality of communicatively interfaced protocol layers, each such protocol layer comprising one or more procedures for processing data packets;

processing a data frame through the protocol stack, the data frame comprising a plurality of recursively encapsulated data packets which are each encoded with a protocol recognized by one of the protocol layers; and collecting data directly from the protocol stack from at least one of the processed data packets using a protocol stack multiplexor, comprising:

interfacing directly into at least one such protocol layer through redirected references to the data packet processing procedures comprised within the at least one such protocol layer;

obtaining a logical reference to the processed data packets from the interfaced protocol layer, the logical reference referring to a memory block in the kernel memory space within which the processed data packets are stored; and providing the logical reference to an intrusion detection analyzer executing within user memory space.

9. A method according to claim 8, further comprising:

providing a network hardware interface in a link protocol layer logically located at a device end of the protocol stack;

providing an application software interface in a transport protocol layer logically located at a user end of the protocol stack; and tapping the collected data from the protocol stack between and through the link protocol layer and the transport protocol layer.

10. A method according to claim 9, wherein the protocol stack comprises a Transmission Control Protocol/Internet Protocol-compliant (TCP/IP) protocol stack.

11. A method according to claim 8, further comprising:

storing incoming data frames in a read queue associated with each protocol layer;

storing outgoing data frame in a write queue associated with each protocol layer; and retrieving the logical reference to the processed data packets from at least one of the read queue and the write queue.

12. A method according to claim 8, further comprising:

storing the references to the data packet processing procedures comprised within the at least one such protocol layer in a module switch table in the kernel memory space; and replacing select procedure references in the module switch table with references to data collection procedures in the protocol stack multiplexor.

13. A method according to claim 12, wherein one such protocol layer comprises a Transmission Control Protocol-compliant (TCP) protocol layer, further comprising:

augmenting the procedure references in the module switch table for the procedures for processing data frames for the TCP protocol layer with references to TCP data collection procedures in the protocol stack multiplexor.

14. A method according to claim 12, wherein one such protocol layer comprises a User Datagram Protocol-compliant (UDP) protocol layer, further comprising:

replacing the procedure references in the module switch table for the procedures for processing incoming data frames for the UDP protocol layer with references to UDP data collection procedures in the protocol stack multiplexor.

15. A storage medium for intrusion detection data collection using a protocol stack multiplexor, comprising:

defining a hierarchical protocol stack within kernel memory space and comprising a plurality of communicatively interfaced protocol layers, each such protocol layer comprising one or more procedures for processing data packets;

processing a data frame through the protocol stack, the data frame comprising a plurality of recursively encapsulated data packets which are each encoded with a protocol recognized by one of the protocol layers; and collecting data directly from the protocol stack from at least one of the processed data packets using a protocol stack multiplexor, comprising:

interfacing directly into at least one such protocol layer through redirected references to the data packet processing procedures comprised within the at least one such protocol layer;

obtaining a logical reference to the processed data packets from the interfaced protocol layer, the logical reference referring to a memory block in the kernel memory space within which the processed data packets are stored; and providing the logical reference to an intrusion detection analyzer executing within user memory space.

16. A storage medium according to claim 15, further comprising:

providing a network hardware interface in a link protocol layer logically located at a device end of the protocol stack;

providing an application software interface in a transport protocol layer logically located at a user end of the protocol stack; and tapping the collected data from the protocol stack between and through the link protocol layer and the transport protocol layer.

17. A storage medium according to claim 15, further comprising:

storing incoming data frames in a read queue associated with each protocol layer;

storing outgoing data frame in a write queue associated with each protocol layer; and retrieving the logical reference to the processed data packets from at least one of the read queue and the write queue.

18. A storage medium according to claim 15, further comprising:

storing the references to the data packet processing procedures comprised within the at least one such protocol layer in a module switch table in the kernel memory space; and replacing select procedure references in the module switch table with references to data collection procedures in the protocol stack multiplexor.

19. A storage medium according to claim 18, wherein one such protocol layer comprises a Transmission Control Protocol-compliant (TCP) protocol layer and a further such protocol layer comprises a User Datagram Protocol-compliant (UDP) protocol layer, further comprising:

augmenting the procedure references in the module switch table for the procedures for processing data frames for the TCP protocol layer with references to TCP data collection procedures in the protocol stack multiplexor; and replacing the procedure references in the module switch table for the procedures for processing incoming data frames for the UDP protocol layer with references to UDP data collection procedures in the protocol stack multiplexor.

20. A system for detecting network intrusions using a protocol stack multiplexor, comprising:

a network protocol stack comprising a plurality of hierarchically structured protocol layers, each such protocol layer comprising a read queue and a write queue for staging transitory data packets and a set of procedures for processing the transitory data packets in accordance with the associated protocol;

a protocol stack multiplexor interfaced directly to at least one such protocol layer through a set of redirected pointers to the processing procedures of the interfaced protocol layer, further comprising:

a data packet collector referencing at least one of the read queue and the write queue for the associated protocol layer; and a data packet exchanger communicating a memory reference to each transitory data packet from the referenced at least one of the read queue and the write queue for the associated protocol layer; and an analysis module receiving the communicated memory reference and performing intrusion detection based thereon.

21. A system according to claim 20, further comprising:

a module switch table storing a set of pointers to the processing procedures of the interfaced protocol layer; and an initialization module selectively redirecting the set of pointers to a set of data collection procedures comprised in the protocol stack multiplexor.

22. A system according to claim 21, further comprising:

a one-way shim redirecting the set of pointers for processing the transitory data packets for one of the read queue and the write queue for the associated protocol layer.

23. A system according to claim 21, further comprising:

a two-way shim redirecting the set of pointers for processing the transitory data packets for both the read queue and the write queue for the associated protocol layer.

24. A system according to claim 20, wherein the network protocol stack is a TCP/IP-compliant protocol stack, further comprising:

a set of TCP/IP-compliant protocol layers, selected from the group comprising at least:
a data link protocol layer;
an Internet (IP) protocol layer;
an Transmission Control Protocol (TCP) layer; and
a User Datagram Protocol (UDP) layer.

25. A method for detecting network intrusions using a protocol stack multiplexor, comprising:

executing a network protocol stack comprising a plurality of hierarchically structured protocol layers, each such protocol layer comprising a read queue and a write queue for staging transitory data packets and a set of procedures for processing the transitory data packets in accordance with the associated protocol;

interfacing a protocol stack multiplexor directly to at least one such protocol layer through a set of redirected pointers to the processing procedures of the interfaced protocol layer, further comprising:
referencing at least one of the read queue and the write queue for the associated protocol layer; and
communicating a memory reference to each transitory data packet from the referenced at least one of the read queue and the write queue for the associated protocol layer; and receiving the communicated memory reference into an analysis module and performing intrusion detection based thereon.

26. A method according to claim 25, further comprising:

storing a set of pointers to the processing procedures of the interfaced protocol layer into a module switch table; and selectively redirecting the set of pointers to a set of data collection procedures comprised in the protocol stack multiplexor.

27. A method according to claim 26, further comprising:

redirecting the set of pointers for processing the transitory data packets for one of the read queue and the write queue for the associated protocol layer.

28. A method according to claim 26, further comprising:

redirecting the set of pointers for processing the transitory data packets for both the read queue and the write queue for the associated protocol layer.

29. A method according to claim 25, wherein the network protocol stack is a TCP/IP-compliant protocol stack, further comprising:

defining a set of TCP/IP-compliant protocol layers, selected from the group comprising at least:

a data link protocol layer;

an Internet (IP) protocol layer;

an Transmission Control Protocol (TCP) layer; and a User Datagram Protocol (UDP) layer.

\* \* \* \* \*